US012583314B1

(12) United States Patent
Deutschmann et al.

(10) Patent No.: US 12,583,314 B1
(45) Date of Patent: Mar. 24, 2026

(54) BREATHED AIR DELIVERY DEVICE AND VEHICLE STEERING ASSEMBLIES INCLUDING SAME FOR ALCOHOL DETECTION

(71) Applicant: TOYODA GOSEI CO., LTD, Kiosu (JP)

(72) Inventors: Roy P. Deutschmann, South Lyon, MI (US); Elaina M. Emig, Detroit, MI (US); David L. Guyton, Jr., Commerce Township, MI (US)

(73) Assignee: TOYODA GOSEI CO., LTD., Kiosu (JP)

( * ) Notice: Subject to any disclaimer, the term of this patent is extended or adjusted under 35 U.S.C. 154(b) by 0 days.

(21) Appl. No.: 19/063,498

(22) Filed: Feb. 26, 2025

(51) Int. Cl.
  *B60K 28/06*        (2006.01)
  *B62D 1/04*         (2006.01)
(52) U.S. Cl.
  CPC ............ *B60K 28/063* (2013.01); *B62D 1/046* (2013.01)
(58) Field of Classification Search
  CPC ...... B60K 28/063; B60K 28/06; B62D 1/046; G01N 33/4972; B60W 2540/24
  See application file for complete search history.

(56) References Cited

U.S. PATENT DOCUMENTS

| | | | |
|---|---|---|---|
| 7,911,350 B2 | 3/2011 | Shoji et al. | |
| 8,844,337 B2 * | 9/2014 | Kountotsis | G01N 33/50 73/23.3 |
| 2006/0016278 A1 * | 1/2006 | Duval | B62D 1/046 73/864 |
| 2006/0044144 A1 * | 3/2006 | Duval | A61B 5/14546 340/576 |
| 2006/0179901 A1 * | 8/2006 | Schlitt | B60R 25/0225 70/209 |
| 2008/0316037 A1 * | 12/2008 | Shoji | B60K 28/063 340/576 |
| 2019/0126751 A1 * | 5/2019 | Joshi | G01N 33/4972 |
| 2019/0202464 A1 * | 7/2019 | McGill | B60W 60/0053 |

FOREIGN PATENT DOCUMENTS

| | | | | |
|---|---|---|---|---|
| CN | 104943726 A | * | 9/2015 | B62D 1/06 |
| JP | 2009247406 A | | 10/2009 | |

* cited by examiner

*Primary Examiner* — Paul N Dickson
*Assistant Examiner* — Shams Dhanani
(74) *Attorney, Agent, or Firm* — Dinsmore & Shohl LLP

(57) ABSTRACT

A steering wheel assembly includes a steering wheel including an inlet hole, a breath sensor including an inlet for detecting an alcohol level within an air sample, and a breathed air delivery device provided between the steering wheel and the breath sensor, the breathed air delivery device fluidly coupling the inlet hole of the steering wheel to the inlet of the breath sensor, the breathed air delivery device including a rotating portion that rotates with the steering wheel and a fixed portion that does not rotate with the steering wheel.

20 Claims, 13 Drawing Sheets

BREATHED AIR DELIVERY DEVICE AND VEHICLE STEERING ASSEMBLIES INCLUDING SAME FOR ALCOHOL DETECTION

TECHNICAL FIELD

The present specification generally relates to systems and methods for detecting and measuring an alcohol content of a vehicle occupant's breath exhaled into an inlet hole and, more specifically, systems and methods incorporating alcohol detection into a steering wheel of a vehicle.

BACKGROUND

Driving under the influence of alcohol remains a leading cause of road accidents and fatalities worldwide. Alcohol-impaired drivers significantly compromise their ability to operate vehicles safely, leading to delayed reaction times, reduced situational awareness, and impaired judgment. Recognizing these dangers, many jurisdictions have enacted strict laws to deter and penalize drunk driving. To aid enforcement and prevention, numerous alcohol detection systems have been developed, ranging from breath analyzers integrated with ignition interlock devices to wearable alcohol monitoring technologies. These systems aim to prevent individuals with elevated blood alcohol concentrations (BAC) from driving, thereby reducing the likelihood of alcohol-related accidents.

Despite their intended benefits, existing alcohol detection systems suffer from significant shortcomings. Breath-based ignition interlock devices can be circumvented or rendered unreliable due to false readings from environmental factors or improper use. Additionally, wearable alcohol monitoring devices often lack integration with vehicle control systems, thereby limiting their preventative driving capabilities. These limitations highlight the need for an advanced alcohol detection system that is reliable in detecting breathed air exhaled by a driver of the vehicle, tamper-resistant, and seamlessly integrated with vehicle safety mechanisms, providing real-time and accurate assessment of a driver's impairment without undue intrusion.

SUMMARY

In one embodiment, a steering wheel assembly includes: a steering wheel including an inlet hole; a breath sensor including an inlet for detecting an alcohol level within an air sample; and a breathed air delivery device provided between the steering wheel and the breath sensor, the breathed air delivery device fluidly coupling the inlet hole of the steering wheel to the inlet of the breath sensor, the breathed air delivery device including a rotating portion that rotates with the steering wheel and a fixed portion that does not rotate with the steering wheel.

In another embodiment, a breathed air delivery device includes: a rear rotating member including a front surface, a rear surface opposite the front surface of the rear rotating member, a column engagement portion extending from the rear surface of the rear rotating member, and one or more fasteners extending from the front surface of the rear rotating member; a rear mounting member including a front surface, a rear surface opposite the front surface of the rear mounting member, an outlet tube engagement portion extending from the rear surface of the rear mounting member, and one or more latches extending from the front surface of the rear mounting member; a front mounting member including a side wall and one or more protrusions formed on an outer surface of the side wall, the one or more protrusions engaging the one or more fasteners of the rear mounting member; and a front rotating member including a front surface, a rear surface opposite the front surface of the front rotating member, a rear rotating member engagement portion extending from the rear surface of the front rotating member, one or more protrusions formed on an inner surface of the rear rotating member engagement portion, the one or more protrusions engaging the fasteners of the rear rotating member, and an inlet tube engagement portion extending from the front surface of the front rotating member.

In yet another embodiment, a vehicle includes: a steering wheel assembly including: a steering wheel including an inlet hole; a breath sensor including an inlet for detecting an alcohol level within an air sample; and a breathed air delivery device provided between the steering wheel and the breath sensor, the breathed air delivery device fluidly coupling the inlet hole of the steering wheel to the inlet of the breath sensor, the breathed air delivery device including a rotating portion that rotates with the steering wheel and a fixed portion that does not rotate with the steering wheel; and an electronic control unit communicatively coupled to the breath sensor, the electronic control unit configured to perform one or more vehicle operating procedures in response to receiving the detected alcohol level from the breath sensor and determining that the detected alcohol level exceeds a predetermined threshold.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
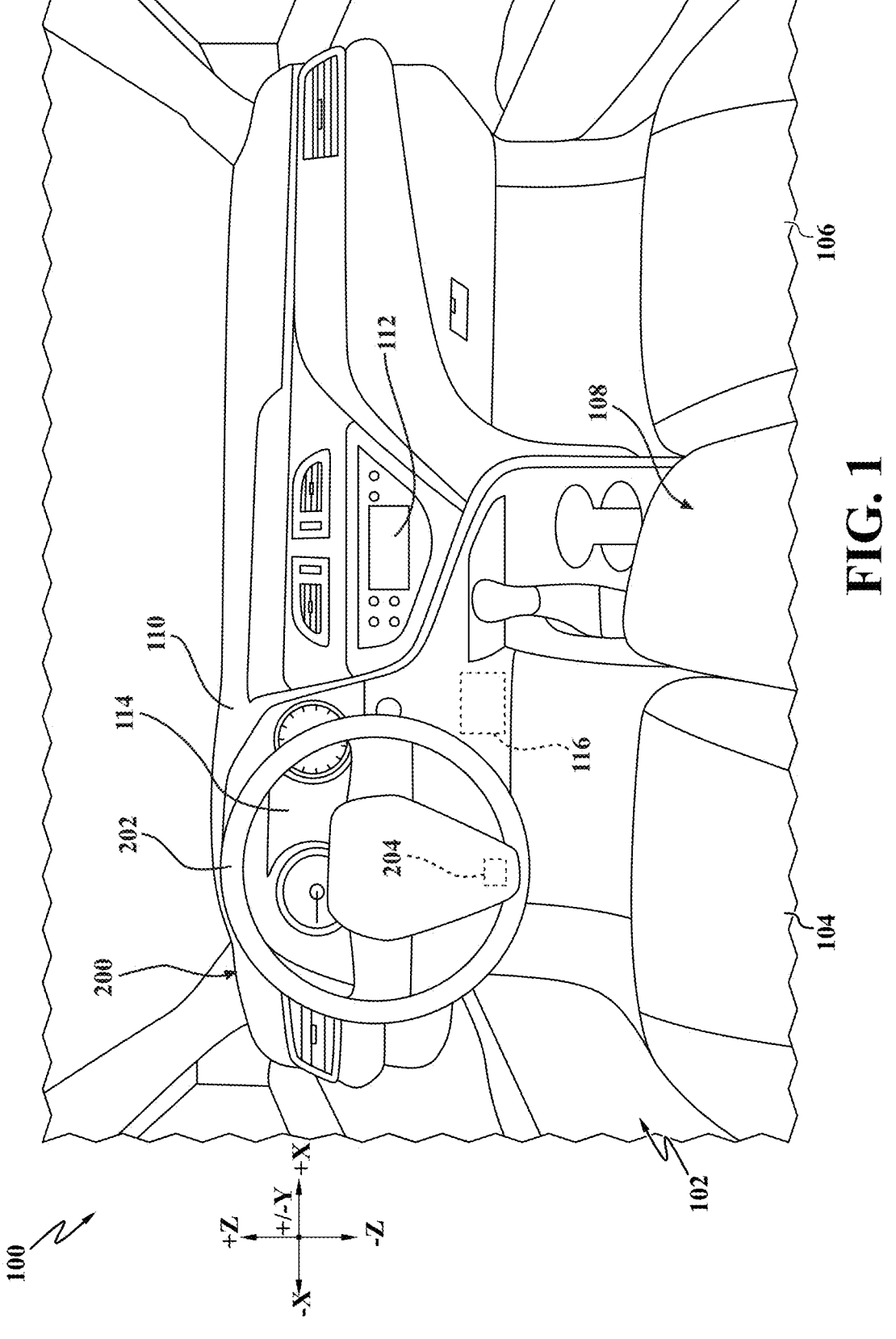
FIG. 1 schematically depicts a partial front view of an interior of a vehicle, according to one or more embodiments shown and described herein.

Embodiments described herein are directed to a steering wheel assembly that includes a breathed air delivery device for detecting a level of alcohol within an air sample collected at a steering wheel. The steering wheel assembly includes a steering wheel including an inlet hole, a breath sensor including an inlet for detecting an alcohol level within an air sample, and a breathed air delivery device provided between the steering wheel and the breath sensor. Various embodiments of the steering wheel assembly and the operation of the steering wheel assembly are described in more detail herein. Whenever possible, the same reference numerals will be used throughout the drawings to refer to the same or like parts.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the term "vehicle longitudinal direction" refers to the forward-rearward direction of the vehicle (i.e., in the +/− vehicle Y direction depicted in FIG. 1). The term "vehicle lateral direction" refers to the cross-vehicle direction (i.e., in the +/− vehicle X direction depicted in FIG. 1), and is transverse to the vehicle longitudinal direction. The term "vehicle vertical direction" refers to the upward-downward direction of the vehicle (i.e., in the +/− vehicle Z direction depicted in FIG. 1). As used herein, "upper" and "above" are defined as the positive Z direction of the coordinate axes shown in the drawings. "Lower" and "below" are defined as the negative Z direction of the coordinate axes shown in the drawings.

Referring now to FIG. 1, a vehicle 100 is illustrated according to one or more embodiments described herein. The vehicle 100 includes an interior cabin 102 in which a driver seat 104 and a front passenger seat 106 are provided with a center console 108 provided therebetween. The vehicle 100 includes a dashboard 110 provided in front of the driver seat 104 and the front passenger seat 106. The dashboard 110 includes a graphical user interface 112, such as an infotainment system, for displaying vehicle information and allowing an occupant in the vehicle 100 to select vehicle operating instructions via one or more buttons or controls. An instrument panel 114 is provided within the dashboard 110 and a steering wheel 202 is provided in front of the driver seat 104 extending in front of the instrument panel 114.

The steering wheel 202 is part of a steering wheel assembly 200 and includes an inlet hole 204 for collecting an air sample from within the interior cabin 102 of the vehicle 100. The air sample is then analyzed, as described in more detail herein, to detect whether the air sample includes a level of alcohol exceeding a predetermined threshold. The steering wheel assembly 200 is communicatively coupled to an electronic control unit 116. Based on whether the air sample includes a level of alcohol exceeding the predetermined threshold, one or more vehicle operating procedures may be performed by the electronic control unit 116. For example, the one or more vehicle operating procedures may include inhibiting an engine or a motor of the vehicle 100 from being activated, displaying a readout of the detected alcohol level in the air sample on the graphical user interface 112, displaying a prompt on the graphical user interface 112 requiring driver attention prior to activating the engine or the motor of the vehicle 100, setting one or more driving restrictions, such as speed, notifying authorized personnel of the detected alcohol level in the air sample, and the like. Each of the above vehicle operating procedures is targeted at ensuring that the vehicle 100 is operated safely, if at all, when the detected alcohol level in the air sample exceeds the predetermined threshold. Additionally, it should be appreciated that the predetermined threshold may be set by the vehicle manufacturer and unable to be changed, disabled either temporarily or permanently, and/or adjusted by an operator of the vehicle 100.

As shown in FIG. 1, the vehicle 100 is provided as an automobile which includes coupes, sedans, minivans, trucks, crossovers, hybrids, and sports utility vehicles. However, the steering wheel assembly 200 is not limited to being incorporated in such automobiles. In embodiments, the steering wheel assembly 200 may be provided in any vehicle such as a watercraft, aircraft, or the like.

Figure 2:
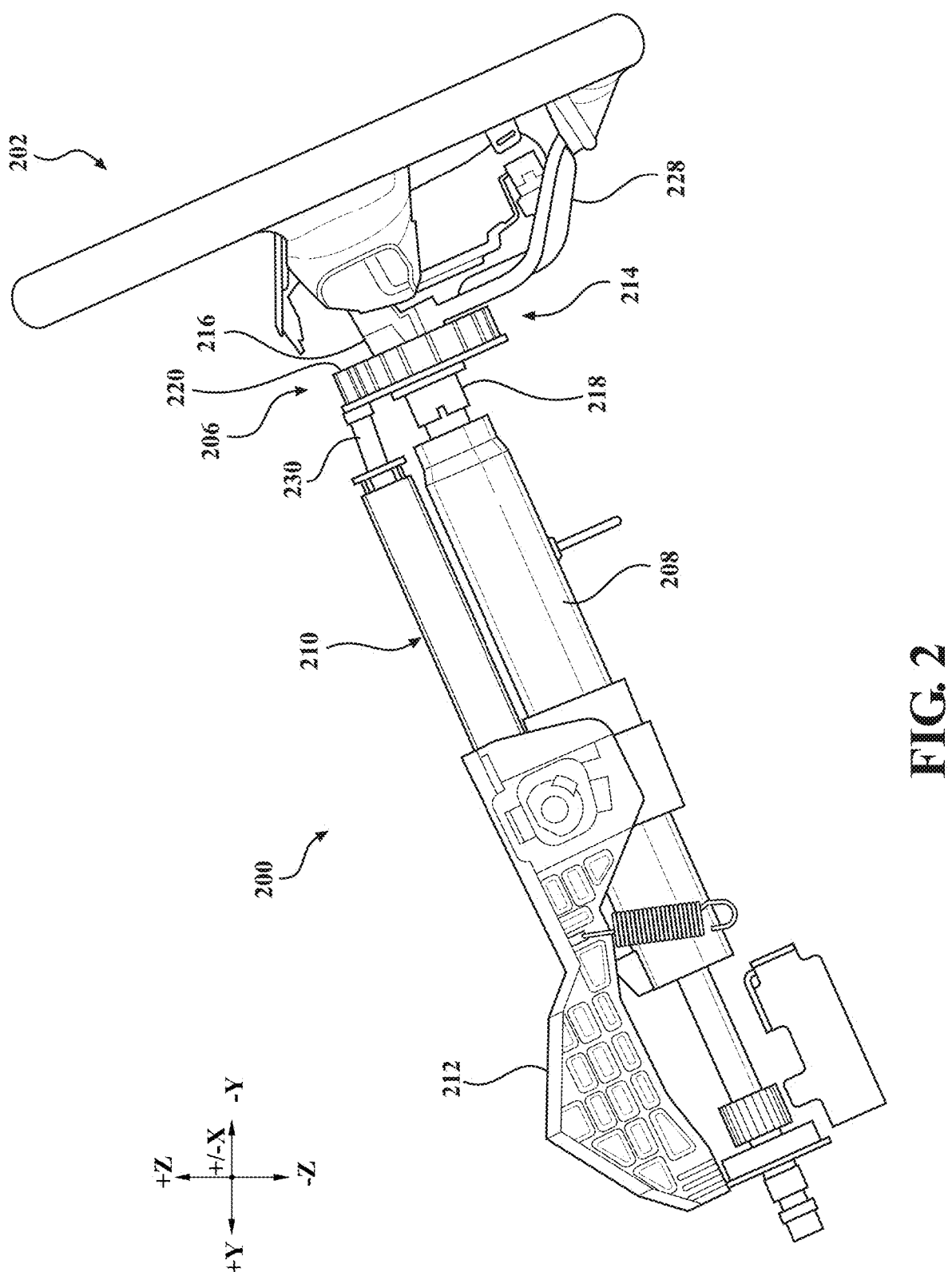
FIG. 2 schematically depicts a side view of a steering wheel assembly including a steering wheel, a clock spring, a steering column, and breath sensor, according to one or more embodiments shown and described herein.

Referring now to FIG. 2, a side view of the steering wheel assembly 200 is illustrated. The steering wheel assembly 200 includes the steering wheel 202, a breathed air delivery device 206, a steering column 208, a breath sensor 210, and a mounting assembly 212. Although the breathed air delivery device 206 is depicted as a clock spring 214 and referred to as such herein, it should be appreciated that the present disclosure is not limited to the breathed air delivery device 206 being a clock spring 214. As such, the breathed air delivery device 206 may be any suitable device configured to deliver an air sample collected at an inlet tube to an outlet tube without departing from the scope of the present disclosure. Additionally, the breathed air delivery device 106 may be a larger assembly including a clock spring or, vice versa, a clock spring may include the breathed air delivery device 106.

Referring still to FIG. 2, the clock spring 214 is mounted at a rear end 216 of the steering wheel 202, and the steering column 208 is mounted at a rear end 218 of the clock spring 214. The breath sensor 210 is also mounted at the rear end 218 of the clock spring 214 above the steering column 208 in the vehicle vertical direction. However, it should be appreciated that the breath sensor 210 may be mounted at any suitable location relative to the steering column 208 such as, for example, below the steering column 208. In embodiments, the mounting assembly 212 is fixed to the steering column 208 and the breath sensor 210 to fix the breath sensor 210 to the steering column 208, as well as fix the steering column 208 and the breath sensor 210 to a frame of the vehicle 100 (FIG. 1).

During operation of the vehicle 100 (FIG. 1), the steering wheel 202 may be rotated by the vehicle operator, which results in rotation of the steering column 208 and subsequent operation of the wheels of the vehicle 100. A rotating portion of the clock spring 214 rotates with the steering wheel 202 and the steering column 208 while a fixed portion of the clock spring 214 remains stationary relative to the steering column 208 to remain rotatably fixed to the breath sensor 210 and the frame of the vehicle 100. As described in more detail herein, the rotating portion of the clock spring 214 permits electrical wires extending from the steering wheel 202 to enter the clock spring 214 from a front end 220 of the clock spring 214 opposite the rear end 218 of the clock spring 214 and rotate with the steering wheel 202, while an opposite end of the electrical wires exiting out of the rear end 218 of the clock spring 214 remain stationary relative to a wire harness or fixed electrical components, for example, the breath sensor 210, to which the electrical wires are attached.

Figure 3:
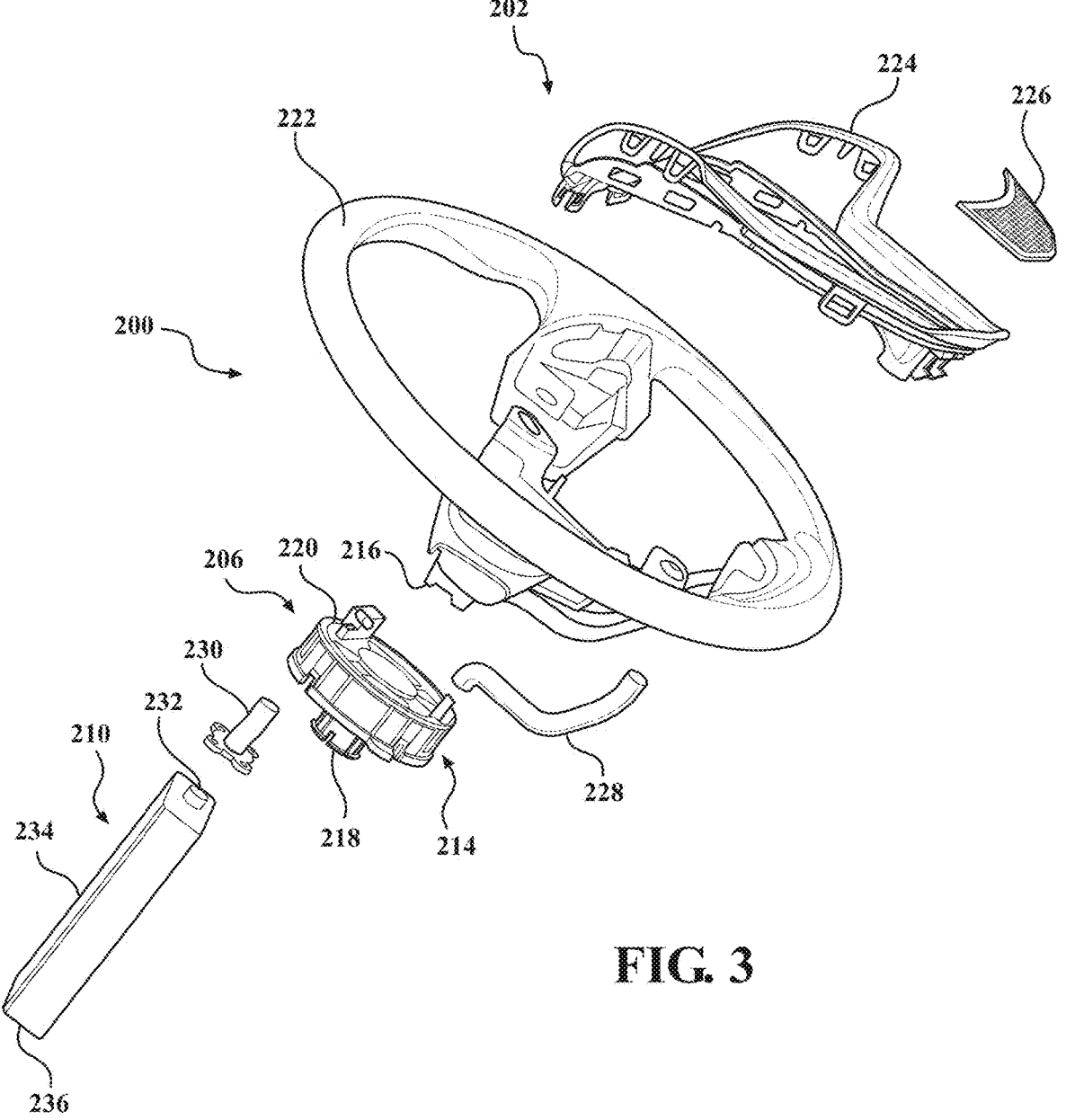
FIG. 3 schematically depicts an exploded perspective view of the steering wheel, the clock spring, and the breath sensor, according to one or more embodiments shown and described herein.

Referring now to FIG. 3, a partial exploded view of the steering wheel assembly 200 is illustrated. As shown, the steering wheel 202 generally includes an outer rim 222, a bezel 224, and an inlet cover 226. An inlet tube 228 is provided between the steering wheel 202 and the clock spring 214, and an outlet tube 230 is provided between the clock spring 214 and an inlet 232 of the breath sensor 210.

The breath sensor 210 may be any suitable air sensing device for detecting the level of alcohol within a collected air sample. The breath sensor 210 includes a housing 234 having the inlet 232 for air intake and an outlet 236 opposite the inlet 232 for exhaust. In embodiments, the breath sensor 210 includes a sensing chamber within the housing 234 including an alcohol-sensitive electrochemical sensor or semiconductor-based detector calibrated for high sensitivity to ethanol molecules. In embodiments, the sensing chamber includes a filter to remove particulates and a humidity control element to optimize performance. In embodiments, the breath sensor 210 includes a fan for drawing air into the sensing chamber through the inlet 232. A microcontroller processes the electrical output of the sensor, translating it into an alcohol concentration value. The microcontroller is communicatively coupled to the electronic control unit 116 of the vehicle 100 (FIG. 1) to control vehicle operation based on a detected level of alcohol within the air sample, as discussed in more detail herein.

Figure 4:
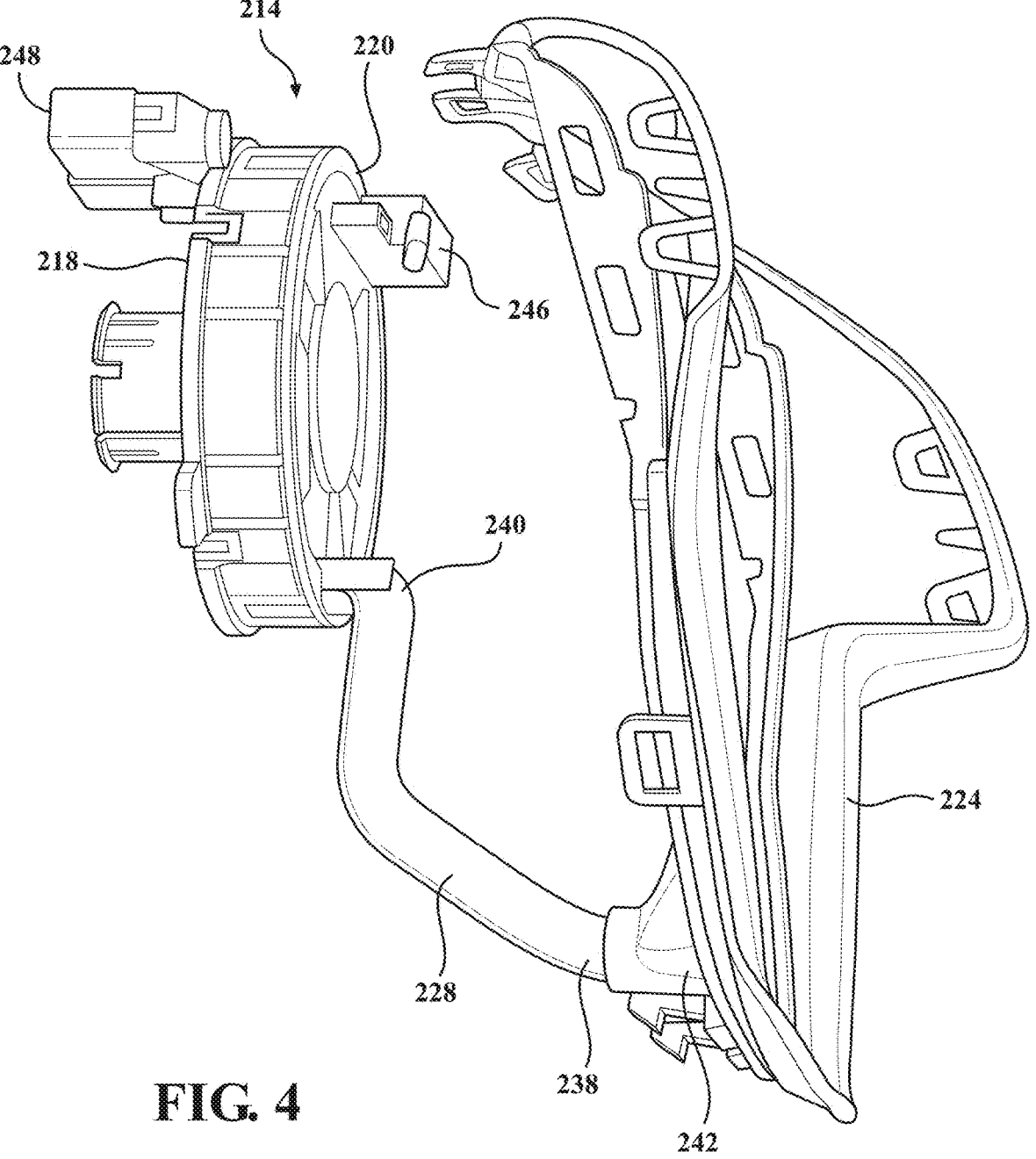
FIG. 4 schematically depicts a side perspective view of the steering wheel and the clock spring, according to one or more embodiments shown and described herein.

Referring now to FIG. 4, a side perspective view of the bezel 224 of the steering wheel 202 is shown fixed to the clock spring 214 by the inlet tube 228. Specifically, the inlet tube 228 includes a front end 238 and a rear end 240 opposite the front end 238. The front end 238 is fixed to a lower receiving portion 242 of the bezel 224, and the rear end 240 is fixed to the clock spring 214. The clock spring 214 includes a front electrical receiver 246 provided at the front end 220 of the clock spring 214 and a rear electrical receiver 248 provided at the rear end 218 of the clock spring 214. The front electrical receiver 246 is mounted to the rotating portion of the clock spring 214 that rotates with the bezel 224 of the steering wheel 202 (FIG. 3), while the rear electrical receiver 248 is mounted to the fixed portion of the clock spring 214 that does not rotate with the bezel 224 of the steering wheel 202. The rear electrical receiver 248 is electrically coupled to an electronic device such as, for example, a combination switch electrically connected to the electronic control unit 116 of the vehicle 100 (FIG. 1). Although not shown, it should be appreciated that one or more electrical wires extend within the clock spring 214 between the front electrical receiver 246 and the rear electrical receiver 248. The one or more electrical wires extending within the clock spring 214 between the front electrical receiver 246 and the rear electrical receiver 248 have a length sufficient to permit a plurality of complete rotations of the bezel 224 of the steering wheel 202. Accordingly, the one or more electrical wires within the clock spring 214 permit electrical components within the steering wheel 202 that rotates during operation of the vehicle 100 (FIG. 1) to be connected to components at a rear side of the clock spring 214 that remain fixed during operation of the vehicle 100.

Figure 5:
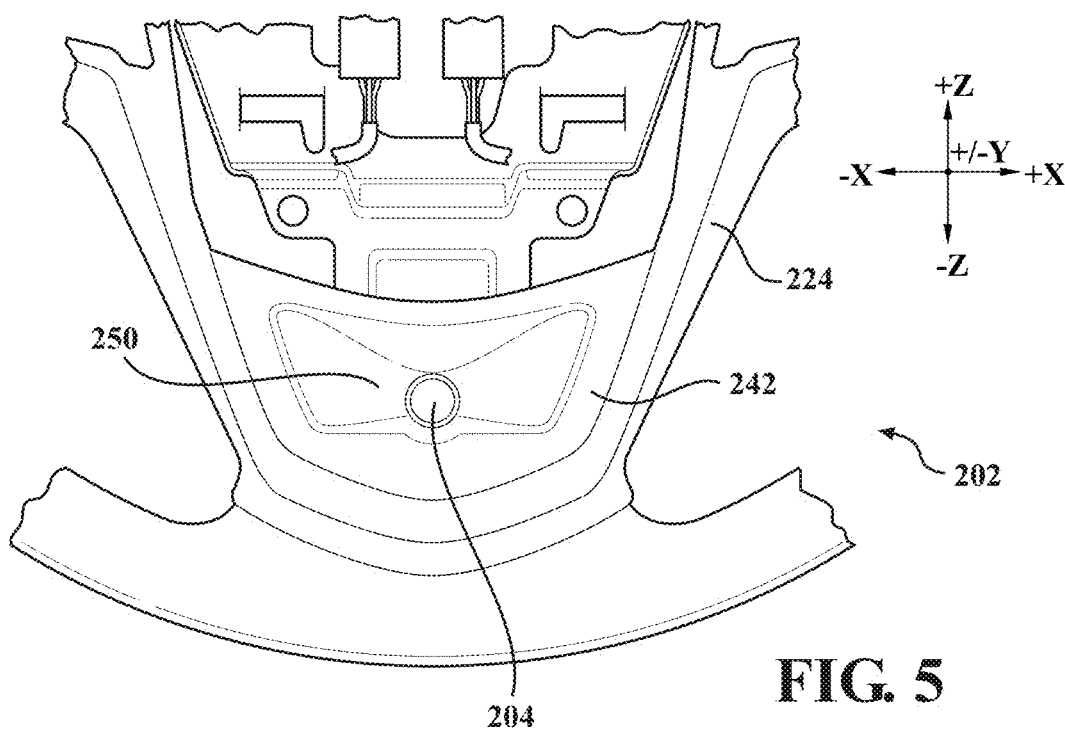
FIG. 5 schematically depicts a partial front view of the steering wheel, according to one or more embodiments shown and described herein.
Figure 6:
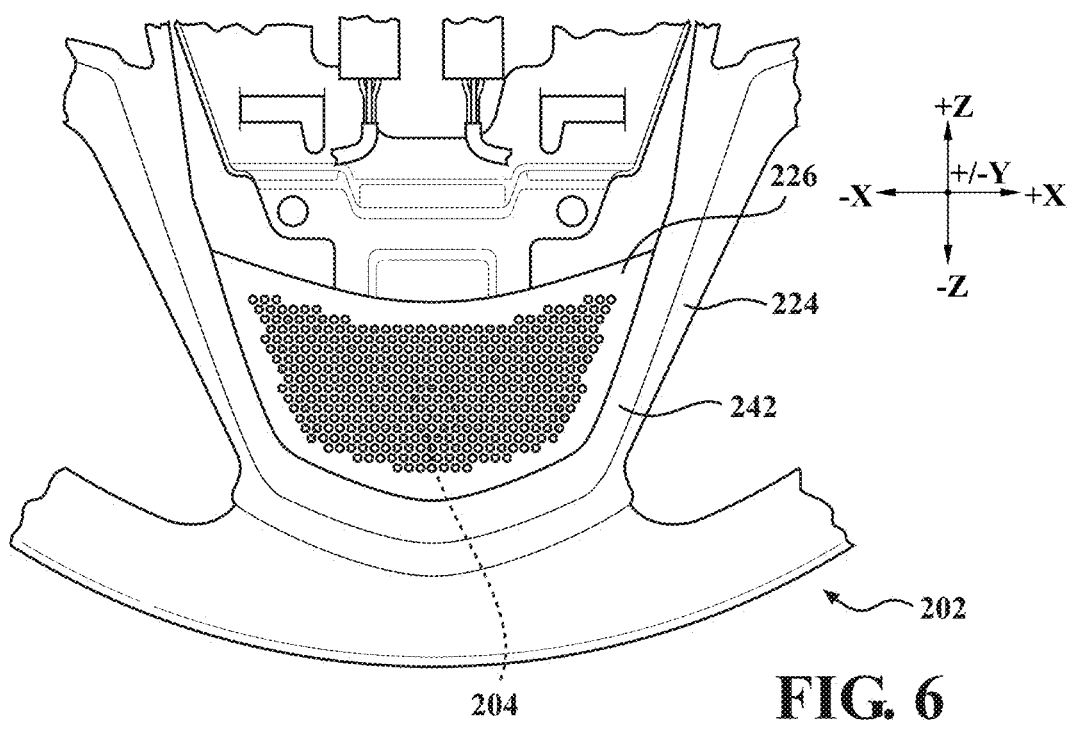
FIG. 6 schematically depicts a partial front view of the steering wheel including an inlet cover, according to one or more embodiments shown and described herein.

Referring now to FIG. 5, a partial front view of the steering wheel 202 is illustrated with the bezel 224 mounted onto the outer rim 222 of the steering wheel 202. As shown, the bezel 224 includes an inlet 250 recessed in the lower receiving portion 242 of the bezel 224 and the inlet hole 204 provided within the inlet 250. The inlet 250 is shaped to direct air, specifically, exhaled air from an occupant of the vehicle 100 seated in the driver seat 104 (FIG. 1), into the inlet hole 204. As shown in FIG. 6, the inlet cover 226 is provided over the lower receiving portion 242 of the bezel 224 and over the inlet 250. Accordingly, the inlet cover 226 prevents debris from directly contacting the inlet hole 204, which may be drawn into the inlet tube 228 and subsequently the clock spring 214 (FIG. 4). As shown in FIG. 6, the inlet cover 226 includes a plurality of openings extending between an exterior surface and an interior surface of the inlet cover 226 to permit air to pass through the inlet cover and into the inlet hole 204 when the inlet cover 226 is coupled to the inlet 250.

Figure 7:
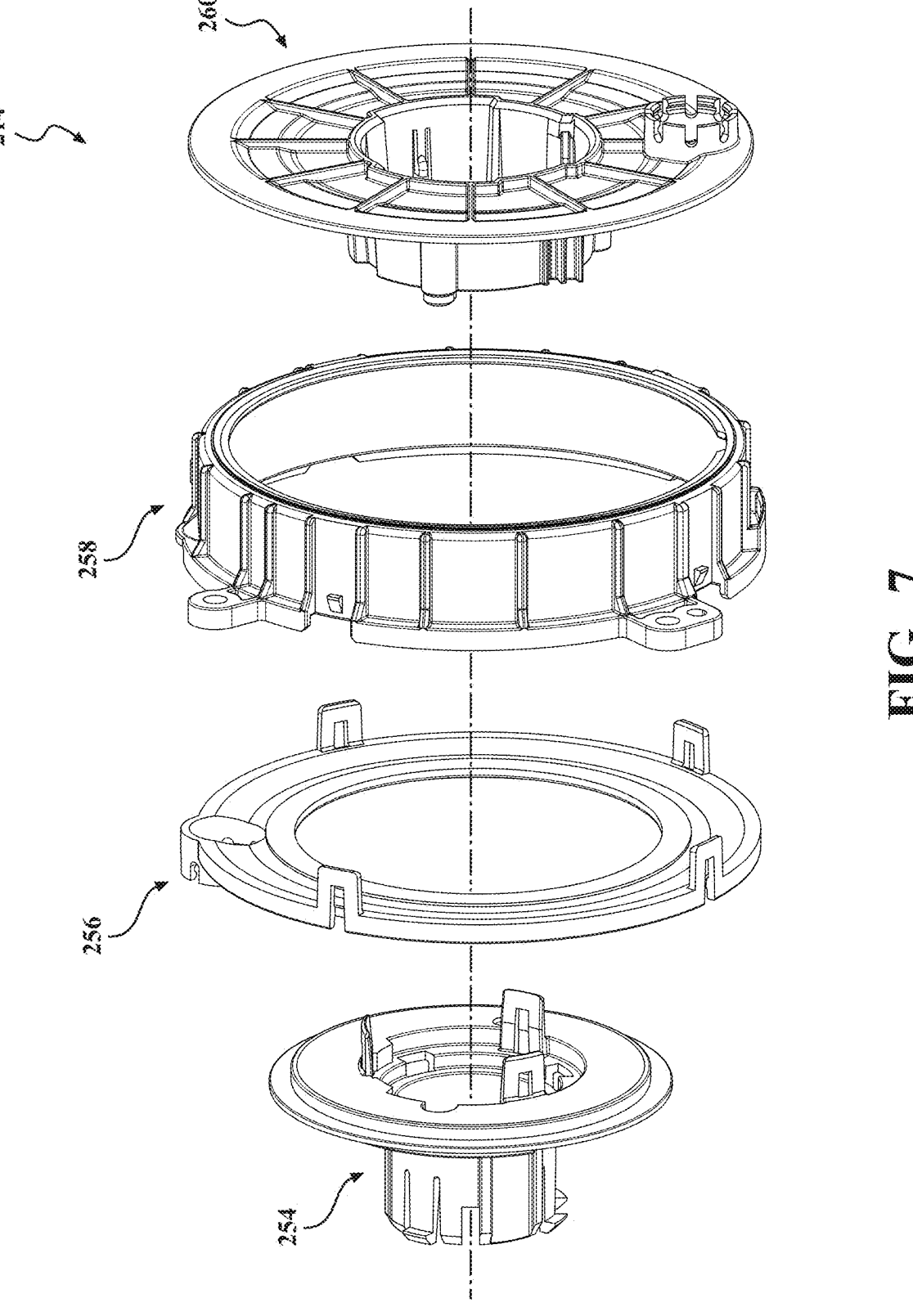
FIG. 7 schematically depicts an exploded perspective view of the clock spring, according to one or more embodiments shown and described herein.

Referring now to FIG. 7, an exploded view of the clock spring 214 is illustrated. Specifically, the clock spring 214 includes a rear rotating member 254, a rear mounting member 256, a front mounting member 258, and a front rotating member 260. As described herein, a rotating portion of the clock spring 214 rotates with the steering wheel 202 and the steering column 208 (FIG. 2), while a fixed portion of the clock spring 214 remains fixed and does not rotate during rotation of the steering wheel 202 and the steering column 208. Specifically, the rotating portion includes the rear rotating member 254 and the front rotating member 260, which are fixed to one another and rotate with the steering wheel 202 and the steering column 208, and the fixed portion includes the rear mounting member 256 and the front mounting member 258, which are fixed to one another and do not rotate during rotation of the steering wheel 202 and the steering column 208.

Figures 8, 9:
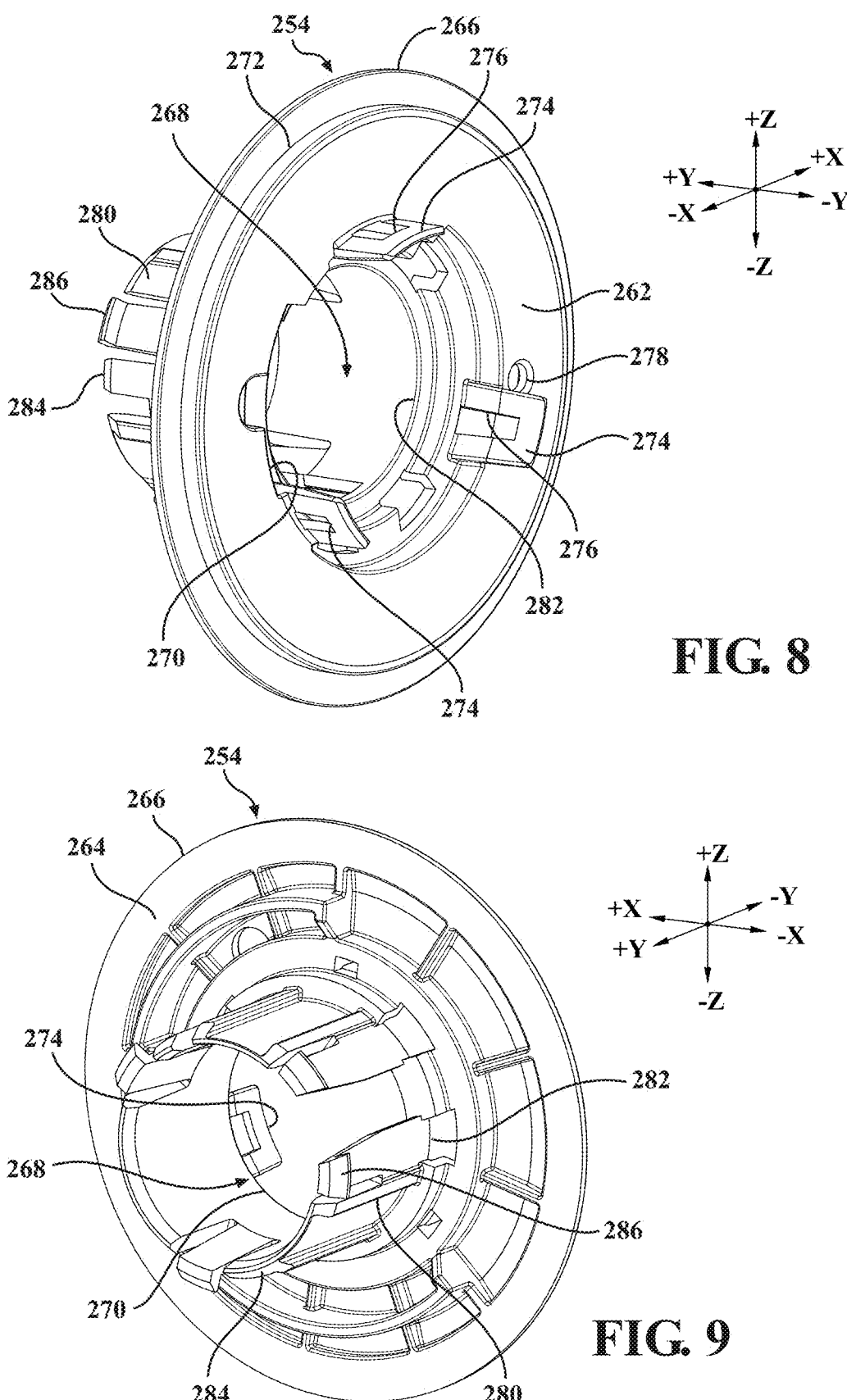
FIG. 8 schematically depicts a front perspective view of a rear rotating member of the clock spring, according to one or more embodiments shown and described herein.
FIG. 9 schematically depicts a rear perspective view of the rear rotating member of the clock spring, according to one or more embodiments shown and described herein.

Referring now to FIGS. 8 and 9, the rear rotating member 254 is illustrated. The rear rotating member 254 includes a front surface 262 and a rear surface 264 opposite the front surface 262. The rear rotating member 254 defines an outer edge 266. A central opening 268 is formed in a center of the rear rotating member 254 and defines an inner edge 270 opposite the outer edge 266. In embodiments, a recess 272 is formed on the front surface 262 of the rear rotating member 254 and extends along a perimeter of the front surface 262. Accordingly, the recess 272 is spaced apart from the central opening 268.

As shown in FIG. 8, one or more fasteners 274 extend from the front surface 262 of the rear rotating member 254 proximate the central opening 268. The fasteners 274 extend from the front surface 262 in a direction opposite the rear surface 264. As shown, three fasteners 274 extend from the front surface 262 proximate the central opening 268. However, it should be appreciated that any number of fasteners 274 may extend from the front surface 262 such as, for example, one, two, or more than three fasteners 274. Each fastener 274 defines a slot 276 formed therein. In embodiments, an aperture 278 is formed extending through the front surface 262 and the rear surface 264 of the rear rotating member 254. The aperture 278 is provided proximate the inner edge 270.

As shown in FIG. 9, a column engagement portion 280 extends from the rear surface 264 of the rear rotating member 254 proximate and about the central opening 268. The column engagement portion 280 extends from the rear surface 264 in a direction opposite the front surface 262. The column engagement portion 280 has a proximal end 282 at the rear surface 264 and a distal end 284 opposite the proximal end 282. The column engagement portion 280 includes one or more latches 286 for securing the rear rotating member 254 to the steering column 208 (FIG. 2). For example, as shown in FIG. 9, a plurality of latches 286 are formed at the distal end 284 of the column engagement portion 280. However, it should be appreciated that the column engagement portion 280 may include any number of latches 286 such as, for example, one, two, or more than three latches 286. Although not depicted, the one or more latches 286 engage corresponding fasteners provided on the steering column 208 (FIG. 2) to join the rear rotating member 254 to the steering column 208 and inhibit rotation of the rear rotating member 254 relative to the steering column 208.

Figures 10, 11:
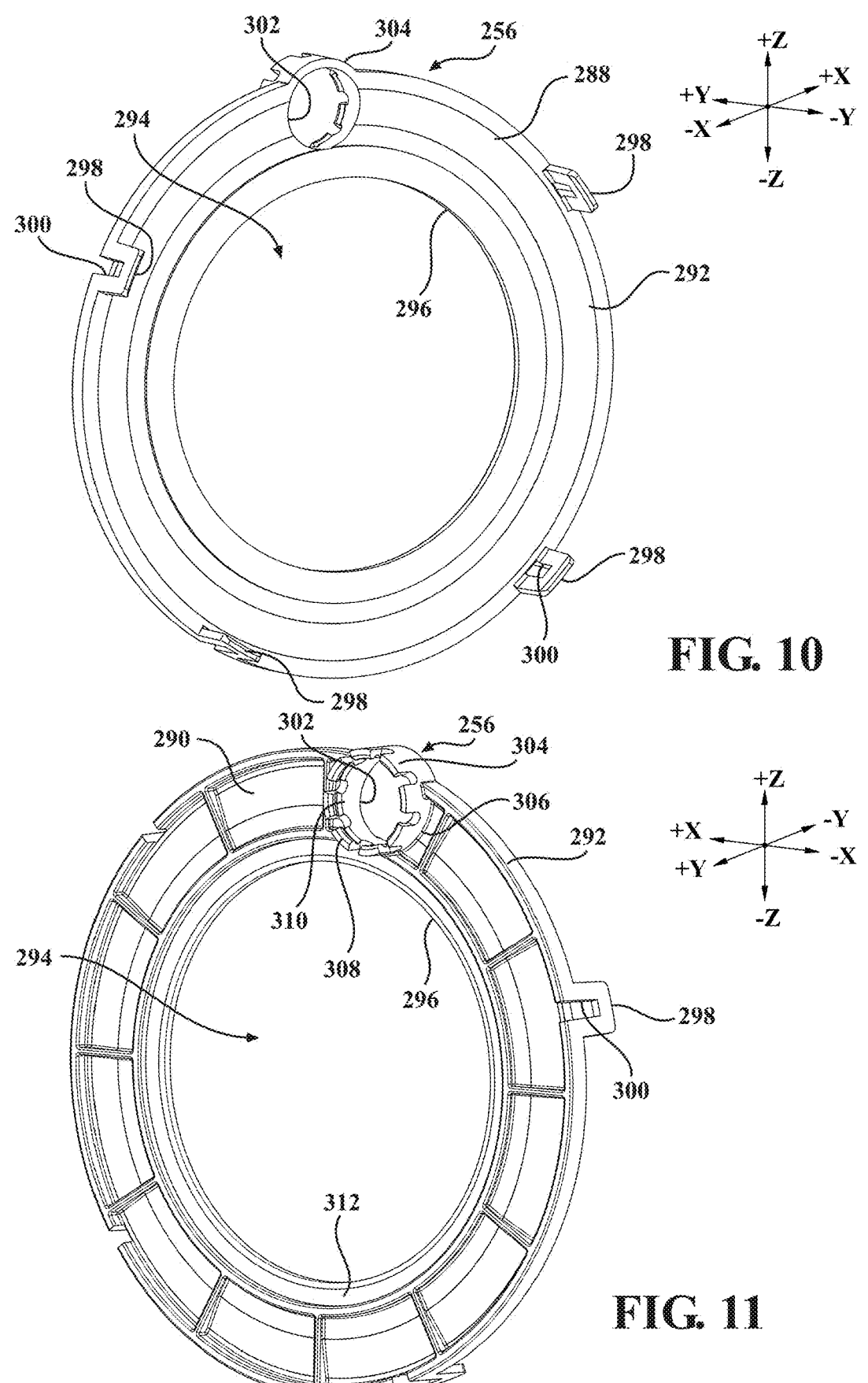
FIG. 10 schematically depicts a front perspective view of a rear mounting member of the clock spring, according to one or more embodiments shown and described herein.
FIG. 11 schematically depicts a rear perspective view of the rear mounting member of the clock spring, according to one or more embodiments shown and described herein.

Referring now to FIGS. 10 and 11, the rear mounting member 256 is illustrated. The rear mounting member 256 includes a front surface 288 and a rear surface 290 opposite the front surface 288. The rear mounting member 256 defines an outer edge 292. A central opening 294 is formed in a center of the rear mounting member 256 and defines an inner edge 296 opposite the outer edge 292.

As shown in FIG. 10, one or more fasteners 298 extend from the front surface 288 of the rear mounting member 256 proximate the outer edge 292. The fasteners 298 extend from the front surface 288 in a direction opposite the rear surface 290. As shown, four fasteners 298 extend from the front surface 288 proximate the outer edge 292. However, it should be appreciated that any number of fasteners 298 may extend from the front surface 288 such as, for example, one, two, three, or more than four fasteners 298. Each fastener 298 defines a slot 300 formed therein. An outlet 302 is formed in the rear mounting member 256. In embodiments, the outlet 302 is formed between the outer edge 292 and the inner edge 296. In other embodiments, the outlet 302 protrudes past the outer edge 292.

As shown in FIG. 11, an outlet tube engagement portion 304 extends from the outlet 302. The outlet tube engagement portion 304 extends from the rear surface 290 in a direction opposite the front surface 288. The outlet tube engagement portion 304 has a proximal end 306 at the rear surface 290 and a distal end 308 opposite the proximal end 306. In embodiments, the outlet tube engagement portion 304 includes one or more latches 310 for securing the outlet tube 230 (FIG. 3) to the rear mounting member 256. However, the outlet tube engagement portion 304 may be coupled to the outlet tube 230 in any suitable manner such as, for example, a friction fit or mechanical engagement. In embodiments, a recess 312 is formed on the rear surface 290 of the rear mounting member 256 and extends along the inner edge 296 defined by the central opening 294. As described in more detail herein, the recess 312 of the rear mounting member 256 is configured to receive the recess 312 of the rear rotating member 254 (FIG. 8).

Figures 12, 13:
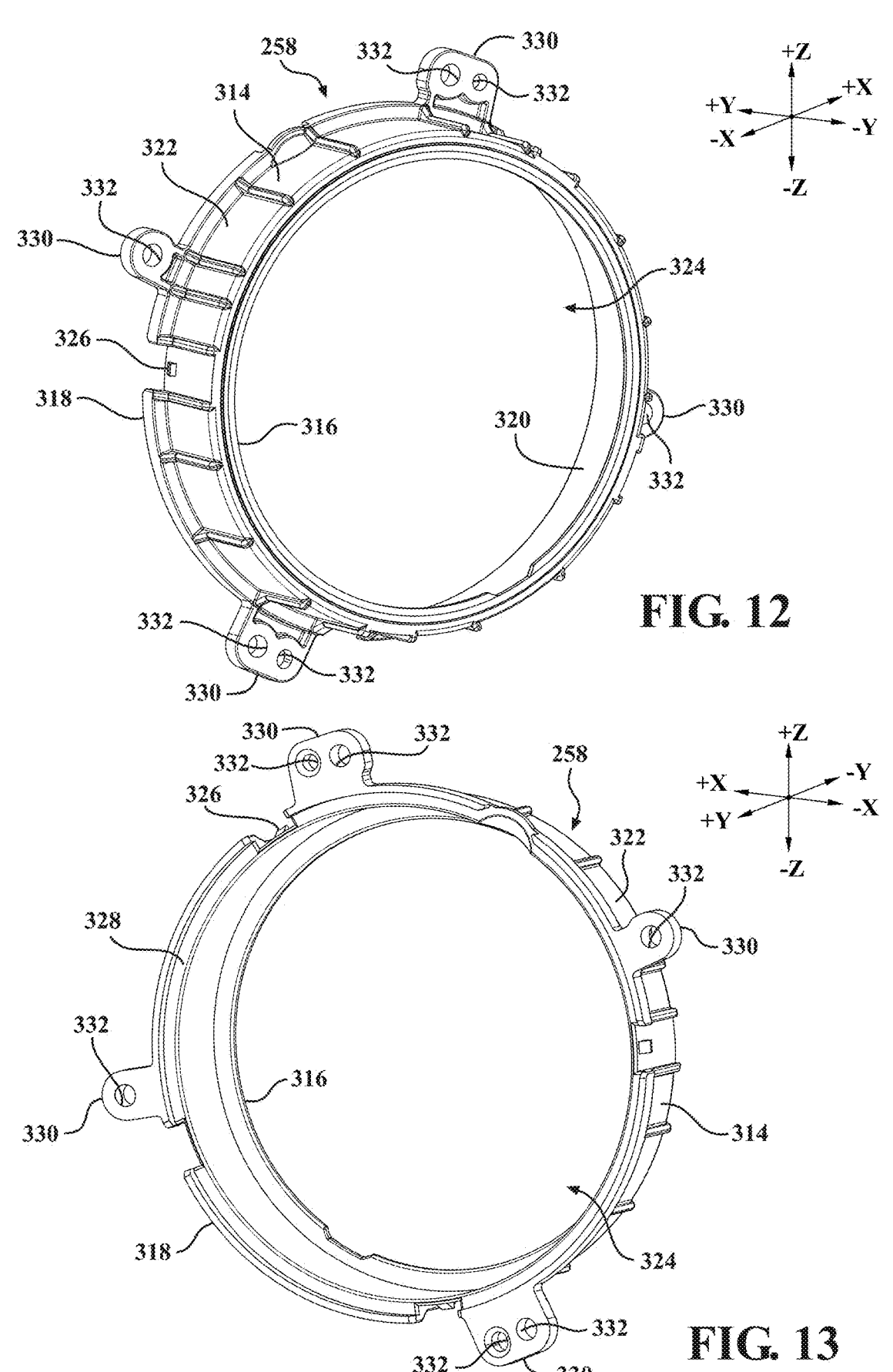
FIG. 12 schematically depicts a front perspective view of a front mounting member of the clock spring, according to one or more embodiments shown and described herein.
FIG. 13 schematically depicts a rear perspective view of the front mounting member of the clock spring, according to one or more embodiments shown and described herein.

Referring now to FIGS. 12 and 13, the front mounting member 258 is illustrated. The front mounting member 258 includes a side wall 314 having a front edge 316, a rear edge 318 opposite the front edge 316, an inner surface 320, and an outer surface 322 opposite the inner surface 320. The inner surface 320 of the side wall 314 defines a central opening 324 extending between the front edge 316 and the rear edge 318 of the side wall 314. One or more protrusions 326 are formed on the outer surface 322 of the side wall 314 proximate the rear edge 318. As shown, a plurality of protrusions 326 are formed on the outer surface 322 of the side wall 314 and equidistantly spaced apart from one another. As described in more detail herein, the protrusions 326 engage the slot 300 formed in the fasteners 298 of the rear mounting member 256 (FIG. 10) to secure the front mounting member 258 to the rear mounting member 256.

As shown in FIG. 13, a lip 328 is formed in the inner surface 320 of the side wall 314 at the rear edge 318. As described in more detail herein, the rear mounting member 256 (FIG. 10) is received within the front mounting member 258 with the outer edge 292 of the rear mounting member 256 abutting against the lip 328 formed in the front mounting member 258. One or more flanges 330 extend from the side wall 314 of the front mounting member 258 proximate the rear edge 318 in a radial direction opposite the central opening 324. As shown, four flanges 330 extend in an outward radial direction from the side wall 314. However, it should be appreciated that the front mounting member 258 may include any number of flanges 330 such as, for example, one, two, three, or more than four flanges 330. Each flange 330 includes one or more holes 332. As shown in FIG. 13, a diametrically opposed pair of flanges 330 include a pair of holes 332, and another diametrically opposed pair of flanges 330 include only a single hole 332. It should be appreciated that the holes 332 receive a fastener that mounts the front mounting member 258 to a frame of the vehicle 100 (FIG. 1). Accordingly, the front mounting member 258 does not rotate relative to the frame of the vehicle 100.

In embodiments, the rear mounting member 256 and the front mounting member 258 may be formed as an integral, one-piece, monolithic component. In such embodiments, the various components coupling the rear mounting member 256 and the front mounting member 258 may not be provided. However, all other structure of the rear mounting member 256 and the front mounting member 258 may remain the same as that described herein.

Figure 14:
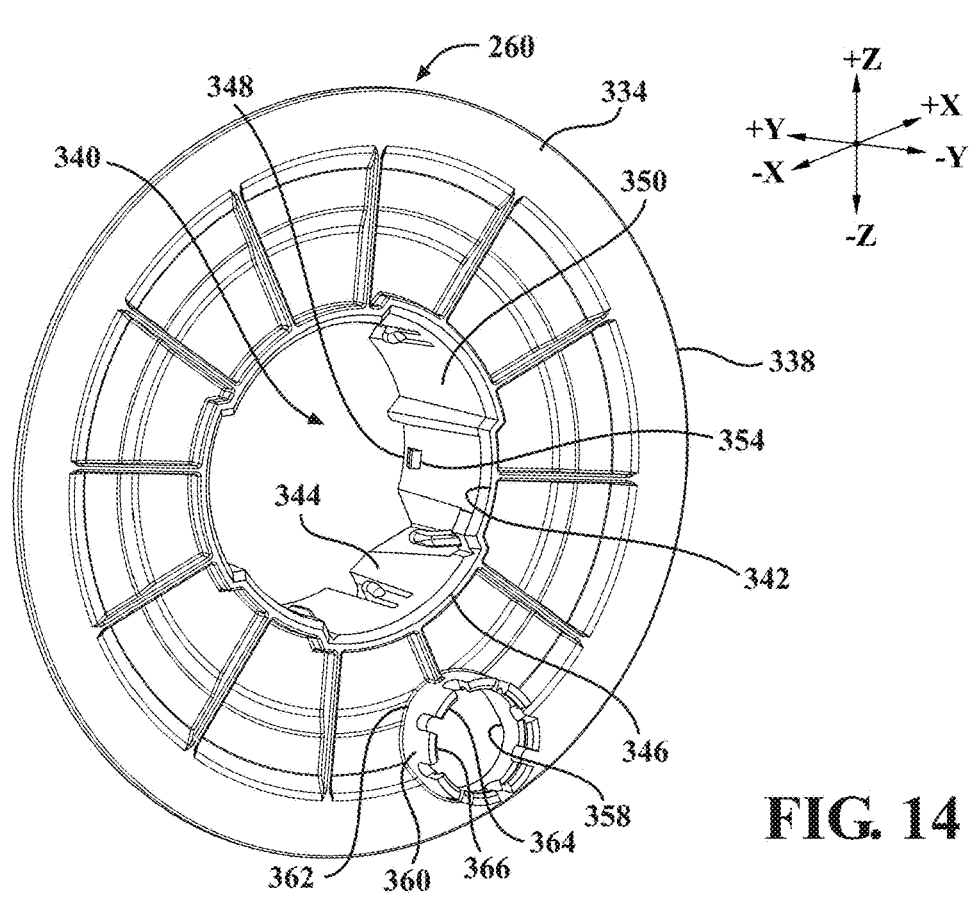
FIG. 14 schematically depicts a front perspective view of a front rotating member of the clock spring, according to one or more embodiments shown and described herein.
Figure 15:
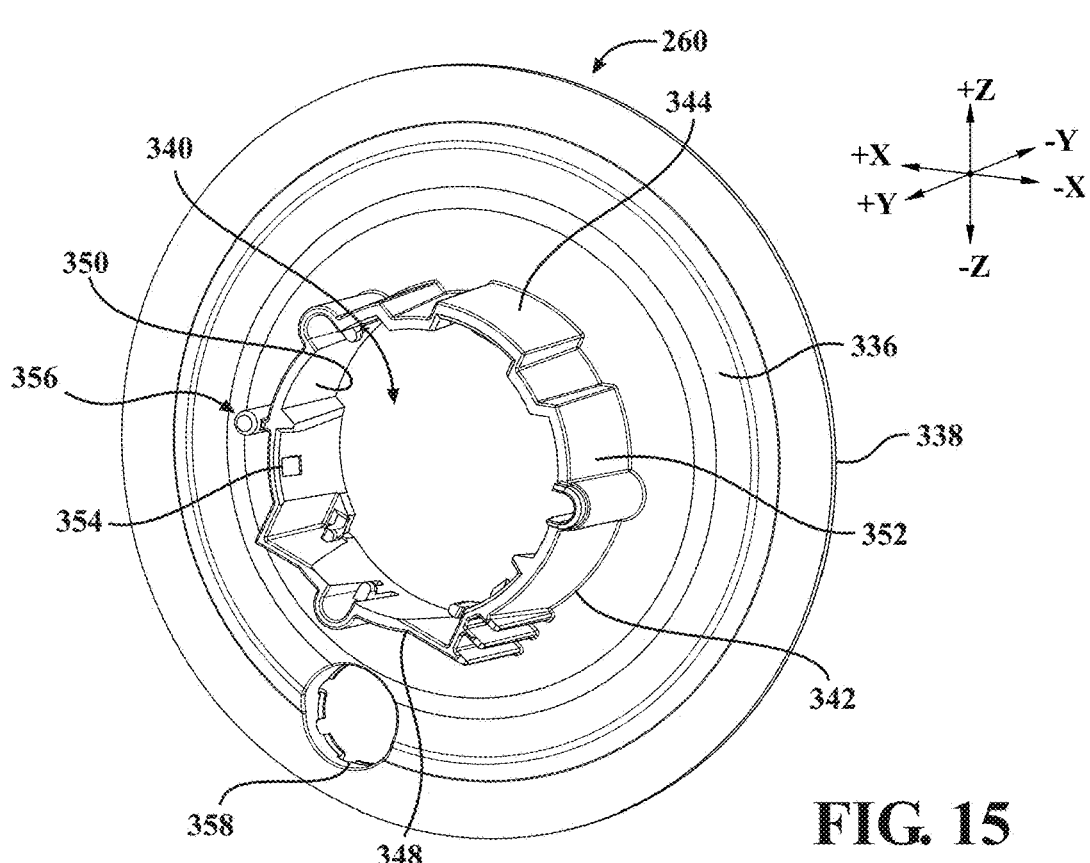
FIG. 15 schematically depicts a rear perspective view of the front rotating member of the clock spring, according to one or more embodiments shown and described herein.

Referring now to FIGS. 14 and 15, the front rotating member 260 is illustrated. The front rotating member 260 includes a front surface 334 and a rear surface 336 opposite the front surface 334. The front rotating member 260 defines an outer edge 338. A central opening 340 is formed in a center of the front rotating member 260 and defines an inner edge 342 opposite the outer edge 338. A rear rotating member engagement portion 344 extends from the rear surface 336 of the front rotating member 260 proximate and about the central opening 340. The rear rotating member engagement portion 344 extends from the rear surface 336 in a direction opposite the front surface 334. The rear rotating member engagement portion 344 has a proximal end 346 at the rear surface 336, a distal end 348 opposite the proximal end 346, an inner surface 350, and an outer surface 352 opposite the inner surface 350. The rear rotating member engagement portion 344 includes one or more protrusions 354 formed on the inner surface 350 of the rear rotating member engagement portion 344 for securing the front rotating member 260 to the rear rotating member 254 (FIG. 8). In embodiments, the rear rotating member engagement portion 344 includes a plurality of protrusions 354 formed at the distal end 348 of the rear rotating member engagement portion 344. As described in more detail herein, the protrusions 354 engage slots 276 formed in the fasteners 274 in the rear rotating member 254 (FIG. 8) to secure the front rotating member 260 to the rear rotating member 254. As shown in FIG. 15, in embodiments, the rear rotating member engagement portion 344 includes a locating protrusion 356 formed on the outer surface 352 of the rear rotating member engagement portion 344. With the rear rotating member 254 in position relative to the front rotating member 260, the locating protrusion 356 is inserted through the aperture 278 (FIG. 8) formed in the rear rotating member 254. This ensures that the rear rotating member 254 is properly oriented relative to the front rotating member 260 during assembly.

An inlet 358 is formed in the front rotating member 260. In embodiments, the inlet 358 is formed between the outer edge 338 and the inner edge 342. In other embodiments, the inlet 358 protrudes past the outer edge 338. As shown in FIG. 14, an inlet tube engagement portion 360 extends from the inlet 358. The inlet tube engagement portion 360 extends from the front surface 334 in a direction opposite the rear surface 336. The inlet tube engagement portion 360 has a proximal end 362 at the rear surface 336 and a distal end 364 opposite the proximal end 362. In embodiments, the inlet tube engagement portion 360 includes one or more latches 366 for securing the inlet tube 228 (FIG. 3) to the front rotating member 260. However, the inlet tube engagement portion 360 may be coupled to the inlet tube 228 in any suitable manner such as, for example, a friction fit or mechanical engagement.

Figures 16, 17:
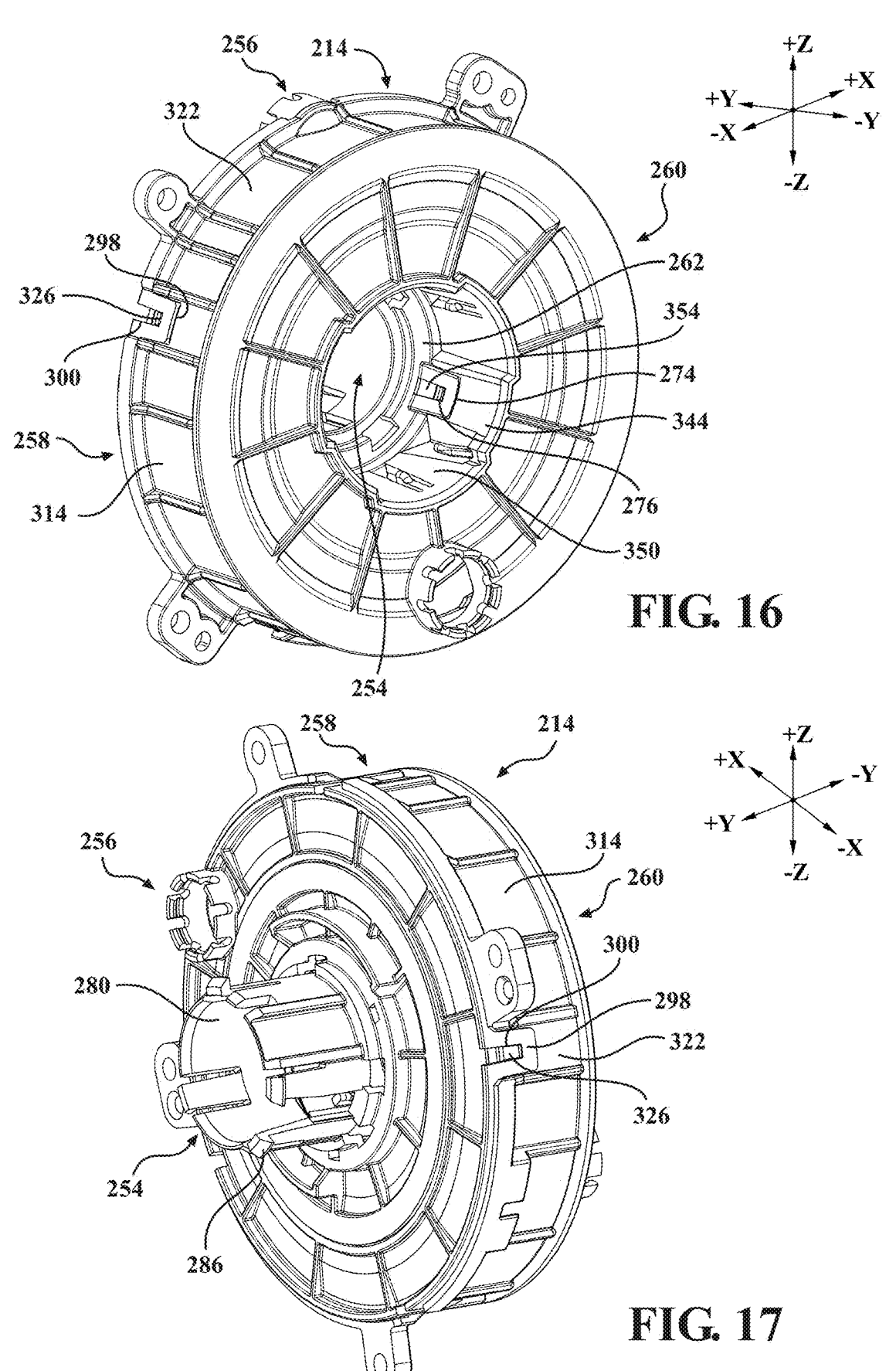
FIG. 16 schematically depicts a front perspective view of the clock spring in an assembled state, according to one or more embodiments shown and described herein.
FIG. 17 schematically depicts a rear perspective view of the clock spring in the assembled state, according to one or more embodiments shown and described herein.

Referring now to FIGS. 16 and 17, the clock spring 214 is shown in an assembled state with the rear rotating member 254 secured to the front rotating member 260. Specifically, the fasteners 274 extending from the front surface 262 of the rear rotating member 254 are shown extending along the inner surface 350 of the rear rotating member engagement portion 344. Additionally, the protrusions 354 formed on the inner surface 350 of the rear rotating member engagement portion 344 are shown received within the slots 276 formed in the fasteners 274 of the rear rotating member 254 to secure the rear rotating member 254 to the front rotating member 260.

Referring still to FIGS. 16 and 17, the rear mounting member 256 is shown secured to the front mounting member 258. Specifically, the protrusions 326 formed on the outer surface 322 of the side wall 314 of the front mounting member 258 are shown received within the slots 300 formed in the fasteners 298 of the rear mounting member 256 to secure the rear mounting member 256 to the front mounting member 258.

With the column engagement portion 280 secured to the steering column 208 (FIG. 2), as described herein via the latches 286 formed on the column engagement portion 280, the rear rotating member 254 and the front rotating member 260 are permitted to rotate with the steering wheel 202 (FIG. 2) while the rear mounting member 256 and the front mounting member 258 remain fixed and stationary relative to the frame of the vehicle 100 (FIG. 1).

Figure 18:
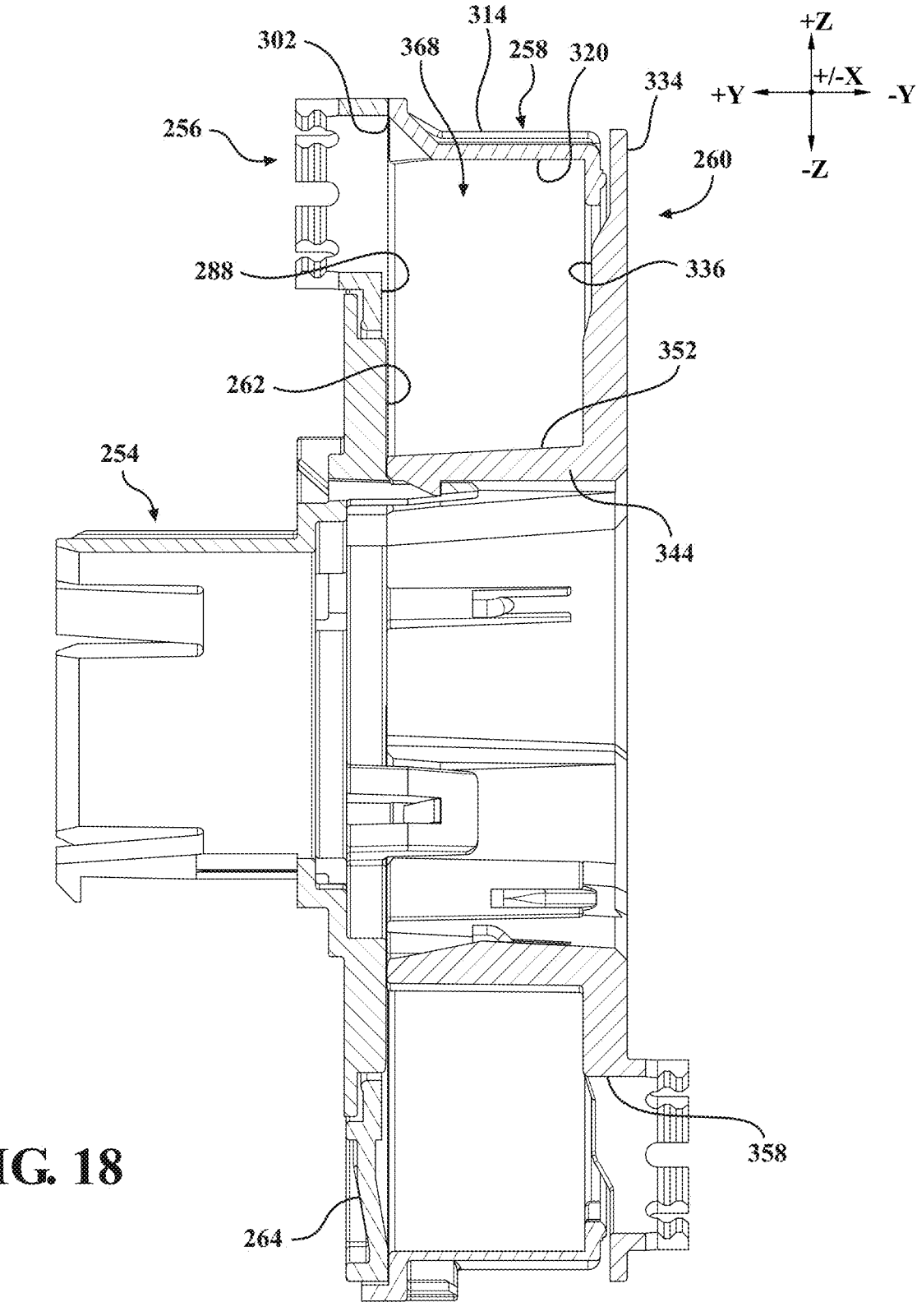
FIG. 18 schematically depicts a cross-sectional side view of the clock spring in the assembled state, according to one or more embodiments shown and described herein.

Referring now to FIG. 18, a cross-sectional side view of the clock spring 214 is shown in the assembled state. The clock spring 214 includes an air chamber 368 defined by the rear surface 336 of the front rotating member 260, the outer surface 352 of the rear rotating member engagement portion 344 of the front rotating member 260, the front surface 262 of the rear rotating member 254, the front surface 288 of the rear mounting member 256, and the inner surface 320 of the side wall 314 of the front mounting member 258. Accordingly, air enters the air chamber 368 through the inlet 358 formed in the front rotating member 260. The air chamber 368 directs the air within the air chamber 368 to exit the air chamber 368 through the outlet 302 formed in the rear mounting member 256. Accordingly, air is permitted to flow into the air chamber 368 through the inlet 358 and out of the air chamber 368 through the outlet 302 regardless of the position of the inlet 358 relative to the outlet 302.

Although not shown in FIG. 18, one or more electrical wires extend within the air chamber 368 from the front electrical receiver 246 (FIG. 4) mounted to the front surface 334 of the front rotating member 260 to the rear electrical receiver 248 (FIG. 4) mounted to rear surface 264 of the rear mounting member 256. As described herein, the electrical wires have a length sufficient to be wound around the rear rotating member engagement portion 344 a plurality of times as the front rotating member 260 is rotated with the steering wheel 202 (FIG. 2).

Figures 19, 20:
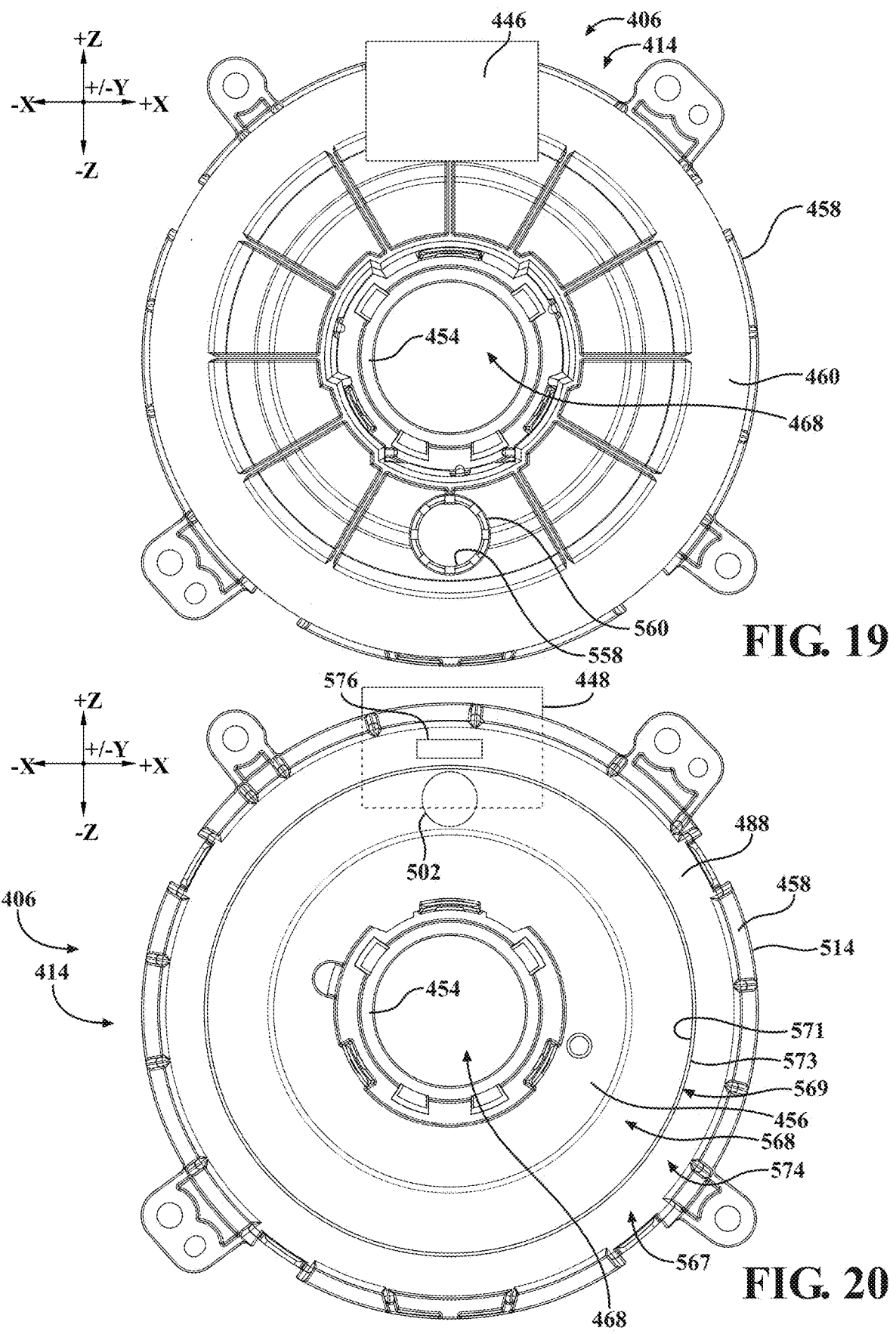
FIG. 19 schematically depicts a front view of another embodiment of a clock spring in an assembled state, according to one or more embodiments shown and described herein.
FIG. 20 schematically depicts a partial front view of the clock spring of FIG. 18 with a front rotating member removed, according to one or more embodiments shown and described herein.

Referring now to FIGS. 19 and 20, another embodiment of a breathed air delivery device 406 to be utilized in combination with the other components of the steering wheel assembly 200 of FIG. 3 is depicted. Although breathed air delivery device 406 is depicted as a clock spring 414 and referred to as such herein, it should be appreciated that the present disclosure is not limited to the breathed air delivery device 406 being a clock spring 414. As such, the breathed air delivery device 406 may be any suitable device configured to deliver an air sample collected at an inlet tube to an outlet tube without departing from the scope of the present disclosure. Additionally, it should be appreciated that the clock spring 414 illustrated in FIGS. 19 and 20 is similar to the clock spring 214 illustrated in FIGS. 16 and 17.

In embodiments in which one or more electrical wires are continuously subjected to air flowing through an air chamber, the one or more electrical wires may be degraded at an increased rate. Accordingly, it may be beneficial to provide a separate chamber for housing the one or more electrical wires that is fluidly isolated from the air chamber.

Thus, the clock spring 414 illustrated in FIGS. 19 and 20 provides separate chambers for the one or more electrical wires and air entering the clock spring 414. As shown in FIG. 19, a front view of the clock spring 414 is shown including a rear rotating member 454, a rear mounting member 456 (FIG. 20), a front mounting member 458, and a front rotating member 460 (FIG. 19). It should be appreciated that the rear rotating member 454, the rear mounting member 456, the front mounting member 458, and the front rotating member 460 are similar to the rear rotating member 254, the rear mounting member 256, the front mounting member 258, and the front rotating member 260 of the clock spring 214 (FIG. 7) with the exception of a diameter of the clock spring 414 being larger than a diameter of the clock spring 214 to accommodate multiple chambers, as described in more detail herein. Accordingly, an inlet 558 is formed in the front rotating member 460 and an inlet tube engagement portion 560 extends from the inlet 558. Additionally, a front electrical receiver 446 is mounted to the front rotating member 460. The front electrical receiver 446 provides a connection point for wires extending from the steering wheel 202 or other electronic components within an interior cabin 102 of the vehicle 100 (FIG. 1).

Referring now to FIG. 20, the front rotating member 460 is removed to better illustrate an open interior 567 of the clock spring 414. As shown, an outlet 502 is formed in the rear mounting member 456. Additionally, a boundary wall 569 is provided in the open interior 567 and extends from a front surface 488 of the rear mounting member 456. The outlet 502 is positioned between the boundary wall 569 and the rear rotating member 454. The boundary wall 569 defines an air chamber 568 located at an inner radial surface 571 of the boundary wall 569 proximate a central opening 468 of the rear rotating member 454, and an electrical chamber 574 is located on an outer radial surface 573 of the boundary wall 569 proximate a side wall 514 of the front mounting member 458. An electronics port 576 is formed on the rear mounting member 456 and a rear electrical receiver 448 is shown mounted on a rear surface of the rear mounting member 456. The electronics port 576 allows for one or more electrical wires extending within the electrical chamber 574 to pass through the electronics port 576 and connect to the rear electrical receiver 448, thus electrically coupling the front electrical receiver 446 (FIG. 19) to the rear electrical receiver 448.

Accordingly, in operation, as air enters the open interior 567 of the clock spring 414 through the inlet 558 formed in the front rotating member 460 (FIG. 19), the air is directed through the air chamber 568 and exits the clock spring 414 through the outlet 502 formed in the rear mounting member 456. In doing so, the air within the air chamber 568 remains isolated from the one or more electrical wires extending within the electrical chamber 574 by the boundary wall 569. This ensures that the air is not contaminated prior to being analyzed and limits contact with the one or more electrical wires to reduce the likelihood of wear.

From the above, it is to be appreciated that defined herein is a steering wheel assembly that includes a breathed air delivery device for detecting a level of alcohol within an air sample collected at a steering wheel. The steering wheel assembly includes a steering wheel including an inlet hole, a breath sensor including an inlet for detecting an alcohol level within an air sample, and a breathed air delivery device provided between the steering wheel and the breath sensor. In embodiments, the breathed air delivery device is a clock spring including a rotating portion that rotates with the steering wheel and a fixed portion that does not rotate with the steering wheel.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A steering wheel assembly comprising:
a steering wheel including an inlet hole;
a breath sensor including an inlet for detecting an alcohol level within an air sample; and
a breathed air delivery device provided between the steering wheel and the breath sensor, the breathed air delivery device fluidly coupling the inlet hole of the steering wheel to the inlet of the breath sensor, the breathed air delivery device including a rotating portion that rotates with the steering wheel and a fixed portion that does not rotate with the steering wheel.

2. The steering wheel assembly of claim 1, wherein the breathed air delivery device includes a clock spring comprising:
a rear rotating member including a front surface, a rear surface opposite the front surface of the rear rotating member;
a rear mounting member including a front surface, a rear surface opposite the front surface of the rear mounting member, an outlet tube engagement portion extending from the rear surface of the rear mounting member;
a front mounting member including a side wall; and
a front rotating member including a front surface, a rear surface opposite the front surface of the front rotating member, a rear rotating member engagement portion extending from the rear surface of the front rotating member, and an inlet tube engagement portion extending from the front surface of the front rotating member.

3. The steering wheel assembly of claim 2, wherein:
the rotating portion includes the rear rotating member and the front rotating member; and
the fixed portion includes the rear mounting member and the front mounting member, the front mounting member being removably attached to the rear mounting member.

4. The steering wheel assembly of claim 2, further comprising:
an inlet tube extending between the inlet tube engagement portion of the front rotating member and the inlet hole of the steering wheel; and an outlet tube extending between the outlet tube engagement portion of the rear mounting member and the inlet of the breath sensor.

5. The steering wheel assembly of claim 2, wherein:

an aperture is formed in the rear rotating member; and a locating feature is formed on an outer surface of the rear rotating member engagement portion of the front rotating member and engages the aperture.

6. The steering wheel assembly of claim 2, wherein the clock spring comprises an air chamber defined by the rear surface of the front rotating member, the front surface of the rear mounting member, and an inner surface of the side wall of the front mounting member.

7. The steering wheel assembly of claim 2, wherein the rear mounting member includes a boundary wall extending from the front surface to define an air chamber and an electrical chamber fluidly isolated from the air chamber.

8. The steering wheel assembly of claim 7, wherein the inlet tube engagement portion and the outlet tube engagement portion are formed within the air chamber.

9. The steering wheel assembly of claim 1, wherein the steering wheel comprises an outer rim and a bezel mounted onto the outer rim, the bezel includes an inlet recessed within a lower receiving portion of the bezel, the inlet hole of the steering wheel is provided within the inlet.

10. The steering wheel assembly of claim 9, further comprising an inlet cover provided over the inlet.

11. A breathed air delivery device comprising:

a rear rotating member including a front surface, a rear surface opposite the front surface of the rear rotating member;

a rear mounting member including a front surface, a rear surface opposite the front surface of the rear mounting member, an outlet tube engagement portion extending from the rear surface of the rear mounting member;

a front mounting member including a side wall; and a front rotating member including a front surface, a rear surface opposite the front surface of the front rotating member, a rear rotating member engagement portion extending from the rear surface of the front rotating member, and an inlet tube engagement portion extending from the front surface of the front rotating member.

12. The breathed air delivery device of claim 11, wherein the rear rotating member and the front rotating member rotate relative to the rear mounting member and the front mounting member.

13. The breathed air delivery device of claim 11, wherein:

an aperture is formed in the rear rotating member; and a locating feature is formed on an outer surface of the rear rotating member engagement portion of the front rotating member and engages the aperture.

14. The breathed air delivery device of claim 11, comprising an air chamber defined by the rear surface of the front rotating member, the front surface of the rear mounting member, and an inner surface of the side wall of the front mounting member.

15. The breathed air delivery device of claim 11, wherein the rear mounting member includes a boundary wall extending from the front surface to define an air chamber and an electrical chamber fluidly isolated from the air chamber.

16. The breathed air delivery device of claim 15, wherein the inlet tube engagement portion and the outlet tube engagement portion are formed within the air chamber.

17. A vehicle comprising:

a steering wheel assembly comprising:

a steering wheel including an inlet hole;

a breath sensor including an inlet for detecting an alcohol level within an air sample; and a breathed air delivery device provided between the steering wheel and the breath sensor, the breathed air delivery device fluidly coupling the inlet hole of the steering wheel to the inlet of the breath sensor, the breathed air delivery device including a rotating portion that rotates with the steering wheel and a fixed portion that does not rotate with the steering wheel; and an electronic control unit communicatively coupled to the breath sensor, the electronic control unit configured to perform one or more vehicle operating procedures in response to receiving the detected alcohol level from the breath sensor and determining that the detected alcohol level exceeds a predetermined threshold.

18. The vehicle of claim 17, wherein the breathed air delivery device includes a clock spring comprising:

a rear rotating member including a front surface, a rear surface opposite the front surface of the rear rotating member;

a rear mounting member including a front surface, a rear surface opposite the front surface of the rear mounting member, an outlet tube engagement portion extending from the rear surface of the rear mounting member;

a front mounting member including a side wall; and a front rotating member including a front surface, a rear surface opposite the front surface of the front rotating member, a rear rotating member engagement portion extending from the rear surface of the front rotating member, the one or more protrusions engaging the fasteners of the rear rotating member, and an inlet tube engagement portion extending from the front surface of the front rotating member.

19. The vehicle of claim 18, further comprising:

an inlet tube extending between the inlet tube engagement portion of the front rotating member and the inlet hole of the steering wheel; and an outlet tube extending between the outlet tube engagement portion of the rear mounting member and the inlet of the breath sensor.

20. The vehicle of claim 17, wherein the one or more vehicle operating procedures includes setting one or more driving restrictions or notifying authorized personnel of the detected alcohol level.

* * * * *